United States Patent
Kowalski et al.

[11] Patent Number: 5,828,469
[45] Date of Patent: Oct. 27, 1998

[54] DOCUMENT SCANNER WITH GRAVITATIONAL REGISTRATION

[75] Inventors: Robert P. Kowalski, Campbell; Carol A. Hankins, Palo Alto, both of Calif.

[73] Assignee: Xerox Corporation, Stamford, Conn.

[21] Appl. No.: 822,446

[22] Filed: Mar. 21, 1997

[51] Int. Cl.⁶ .................................................. H04N 1/04
[52] U.S. Cl. ...................................................... 358/498
[58] Field of Search .................................. 358/448, 449, 358/498; 355/23, 26; 359/808

[56] References Cited

U.S. PATENT DOCUMENTS

| | | | |
|---|---|---|---|
| 4,486,655 | 12/1984 | Kataoka | 250/211 R |
| 4,673,285 | 6/1987 | Shogren | 355/23 |
| 4,734,742 | 3/1988 | Klumpp et al. | 355/23 |
| 5,017,989 | 5/1991 | Street et al. | 357/30 |
| 5,079,426 | 1/1992 | Antonuk et al. | 250/370.09 |
| 5,136,665 | 8/1992 | Inoue | 382/62 |
| 5,298,937 | 3/1994 | Telle | 355/23 |
| 5,339,175 | 8/1994 | Omata et al. | 358/498 |
| 5,359,207 | 10/1994 | Turner | 257/81 |
| 5,377,022 | 12/1994 | Street et al. | 358/498 |
| 5,412,485 | 5/1995 | Kashiwagi | 358/441 |
| 5,568,320 | 10/1996 | Rees et al. | 359/652 |

OTHER PUBLICATIONS

Toshiba, Data Book for CCD Linear Image Sensor, 1993, p. 37 and p. 525.

U. S. Patent Application 08/584,792 entitled "Show–Through Correction for Two–Sided Documents" to Keith T. Knox, filed Jan. 11, 1996.

*Primary Examiner*—Georgia Y. Epps
*Assistant Examiner*—Ricky Mack

[57] ABSTRACT

A substantially vertical contact scanning assembly records both sides of a document in a memory. In one embodiment, the vertical contact imaging assembly is a pair of two-dimensional sensor arrays. The document is fed between the pair of two-dimensional sensor arrays when they are space apart from each other using gravity. A registration stop positioned under the vertical contact imaging assembly aligns one edge of the document with an edge of the pair of two-dimensional sensor arrays. Once properly registered, the pair of two-dimensional sensor arrays are brought into contact with the document. After recording an electronic representation of both sides of the document, the two-dimensional sensor arrays are spaced apart from each other. Subsequently, the document is released into an output tray using gravity by lowering one edge of the registration stop.

20 Claims, 4 Drawing Sheets

DOCUMENT SCANNER WITH GRAVITATIONAL REGISTRATION

The present invention relates generally to a duplex scanning system, and more particularly to a duplex scanning system which images documents that are fed using gravity between a pair of opposing two-dimensional contact imagers.

BACKGROUND OF THE INVENTION

A number of different digital scanning devices exist for recording one or two sides of a hardcopy document. Conventional digital scanning apparatuses typically consist of three elements: an input tray, a scanning module, and an output tray. Generally, the scanning module includes an illumination source, a linear scanner, and an optical focusing device. The linear scanner is formed using an array of CCDs (charge-coupled devices), photodiodes, or the like that detect the extent of reflections off the document from the illumination source. These scanning apparatuses are used to either form a stand alone systems or are combined with another device to form a multi-functional system.

Some optical focusing devices use image reduction optics to focus light reflected off a document onto a linear scanner. Examples of such an optical focusing device are disclosed in U.S. Pat. No. 4,673,285 and 5,136,665. Because of the space requirements of the optical focusing device and the brightness requirements of the illumination source, these systems tend to be enclosed in bulky assemblies. Alternate scanning modules that use contact sensor arrays are housed in more compact assemblies compared to assemblies housing image reduction optics. The disadvantage of contact sensor arrays, however, is that they have a reduced depth of field compared to scanning systems with image reduction optics. One type of contact sensor is a one-dimensional sensor array that includes a one-dimensional gradient index lens, a CCD array and an LED illuminator. An example of a one dimensional contact sensor is disclosed in U.S. Pat. No. 5,568,320. Another type of contact image sensor is a two-dimensional array that records a full page of a document at once using a two-dimensional amorphous silicon sensor array. U.S. Pat. Nos. 5,377,022 and 5,359,207 are examples of scanning modules with a two-dimensional amorphous silicon sensor array. Digital image representations captured with either type of digital scanning devices can be stored in a memory for later processing, archival, or printing.

Various techniques are used to expose both sides of a document to a single scanning module. Some techniques mechanically turn a document over using a recirculating document handler. Once one side of the document is scanned the recirculating document handler flips the document over for the other side to be scanned using the same scanning module. Such recirculating document handlers have the disadvantage of being time consuming because the document has to be mechanically moved and flipped between sides. Another disadvantage of recirculating document handlers is that they may not properly register the front side of a document with the back side of the document because of uncontrolled paper motion between scans. A further disadvantage of recirculating document handlers is that they generally consist of complicated mechanical assemblies. Such mechanical assemblies may jam while operating and damage an original document. Also, recirculating document handlers may not operate with some original documents when one edge of the original document has been deformed or frayed.

Other techniques for exposing two sides of a document use a pair of scanning modules. These alternative duplex scanning techniques position an original document on a conveyance path that constitutes an automatic document feeder. The original document is recorded along the conveyance path by a first image sensor on one side of the conveyance path and a second image sensor on the other side of the conveyance path. Although efficient when scanning black and white images, these scanning techniques have the disadvantage of requiring multiple passes past the image sensors when recording color images. Similar to recirculating document handlers multiple passes along a conveyance path to record different primary colors of a color document may cause registration problems in the composite image. Other scanning apparatuses may duplicate the scanning assemblies to record a color image in a single pass. These alternative apparatuses, however, have the disadvantage of an increased per-unit cost.

None of the above mentioned scanning apparatuses scan color simplex or duplex documents without undue movement by mechanical paper moving systems. In addition, the above mentioned scanning apparatuses require complex registration mechanisms for registering a document with the scanning system. It would be advantageous therefore to provide a scanning apparatus which is simple and does not require complex mechanical paper moving assemblies. This would have the advantage of reducing mechanical failure of a scanning device. In addition, such a scanning device would also have the advantage of being less likely to damage an original document as it is moved from an input tray to an output tray.

Furthermore, an original is often manually placed onto a scanner for fear that the original document may be damaged if the mechanical paper moving systems jams. Manual feeding mechanism generally require that the document be placed on a platen and registered by the operator of the scanning apparatus. Manual registration, however, often requires one or more attempts because the document may move as the cover of a platen is lowered onto the document. Accordingly, it would be a further advantage to provide an improved document scanning device that allows an operator to manually feed a document without requiring a mechanical apparatus for proper registration, thereby insuring the integrity of the original document.

SUMMARY OF THE INVENTION

In accordance with the invention, there is provided an apparatus for scanning a document. The apparatus includes a substantially vertical contact imaging assembly into which the document is fed along a path using gravity.

In accordance with one aspect of the invention, a registration assembly is positioned under the imaging assembly. The registration assembly has a first position in interference with the path of the document for registering an edge of the document using gravity.

In accordance with another aspect of the invention, the registration assembly has a second position for releasing the document from the substantially vertical contact imaging assembly using gravity.

In accordance with yet another aspect of the invention, the apparatus includes a pair of opposing planar members with at least one of the planar members supporting the imaging assembly. A driver moves at least one of the planar members towards the other of the planar members to bring the document registered with the registration assembly into contact with the imaging assembly for recording electronic signals representing information on one side of the document.

BRIEF DESCRIPTION OF THE DRAWINGS

These and other aspects of the invention will become apparent from the following description read in conjunction with the accompanying drawings wherein the same reference numerals have been applied to like parts and in which.

DETAILED DESCRIPTION

Figure 1:
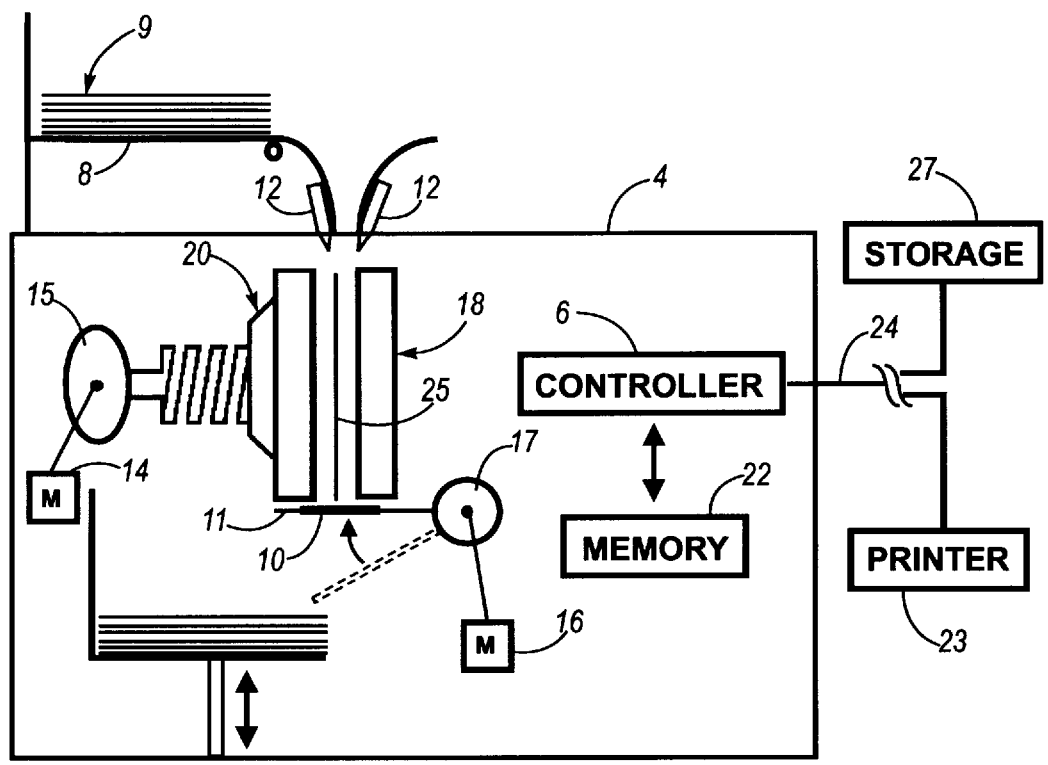
FIG. 1 illustrates a block diagram of the document scanning system incorporating the present invention.

Referring now to the drawings where the showings are for the purpose of describing the preferred embodiment of the invention and not for limiting same, FIG. 1 illustrates a block diagram of the scanning system 4 incorporating the present invention. The scanning system 4 includes a controller 6 which is coupled to an input sensor 8 on input tray 9, a registration sensor 10 on registration stop 11, air knives 12, a cam motor 14 that drives cam 15, a pivot motor 16 that drives pivot 17, contact imagers 18 and 20, and memory 22. A document 25 is positioned between contact imagers 18 and 20 for imaging both sides of the document. Images of the sides of the document 25 recorded by contact imagers 18 and 20 are stored in memory 22 or transmitted via connector 24 to an external device such as a printer 23, or an external storage device 27. Memory 22 may comprise RAM, flash memory, floppy disk, or another form of optical or magnetic storage.

Figure 2:
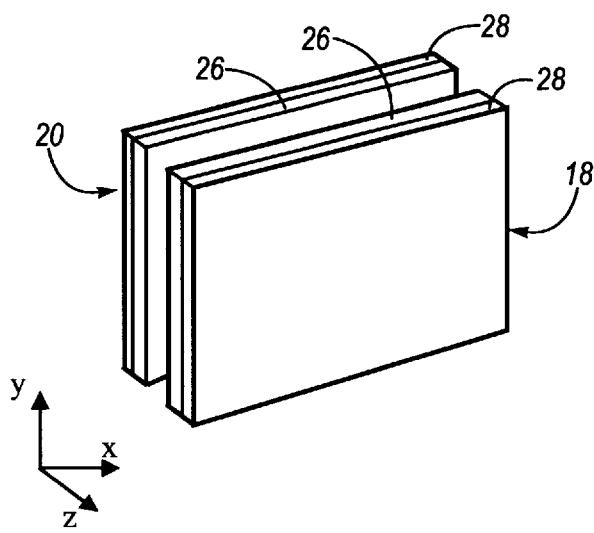
FIG. 2 illustrates a perspective view of opposing contact imagers shown in FIG. 1 for scanning a document.

FIG. 2 illustrates a perspective view of the opposing contact imagers 18 and 20. In one embodiment, the contact imagers 18 and 20 are a pair of two-dimensional sensor arrays 26 and a pair of electroluminescent panels 28. Each of the contact imagers 18 and 20 are located in congruent x-y planes along the z-axis. Consequently, each of two-dimensional sensor arrays 26 have a mirrored spatial reference when imaging opposing sides of a document. The electroluminescent panels 28 are standard illuminators that are used for example in backlit liquid crystal displays. When the scanning system 4 is used to record color images, the electroluminescent panels 28 emit filtered white light to produce three primary colors (i.e., red, green, and blue). In operation, light from an electroluminescent panel 28 travels through a sensor array 26 and reflects off of a side of a document in contact with the sensor array 26. Reflected light off of the side of the document is recorded by the sensor array 26. A more detailed description of two dimensional sensor arrays 26 is disclosed in U.S. Pat. Nos. 5,017,989; 5,079,426; 5,359,207; and 5,377,022 which are incorporated herein by reference.

Figure 3:
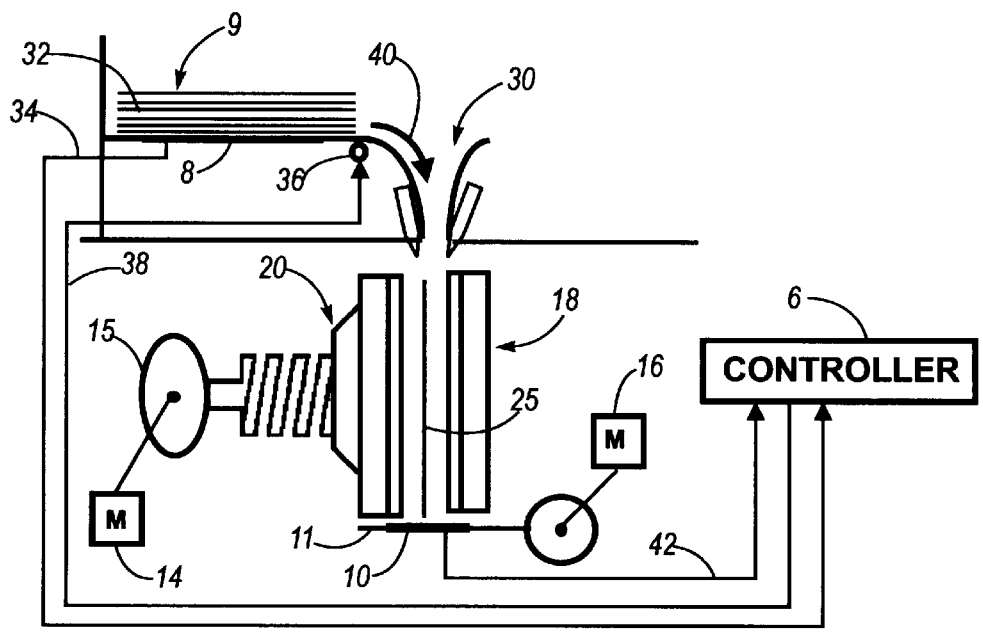
FIG. 3 illustrates the document input stage of the document scanning system shown in FIG. 1.
Figure 4:
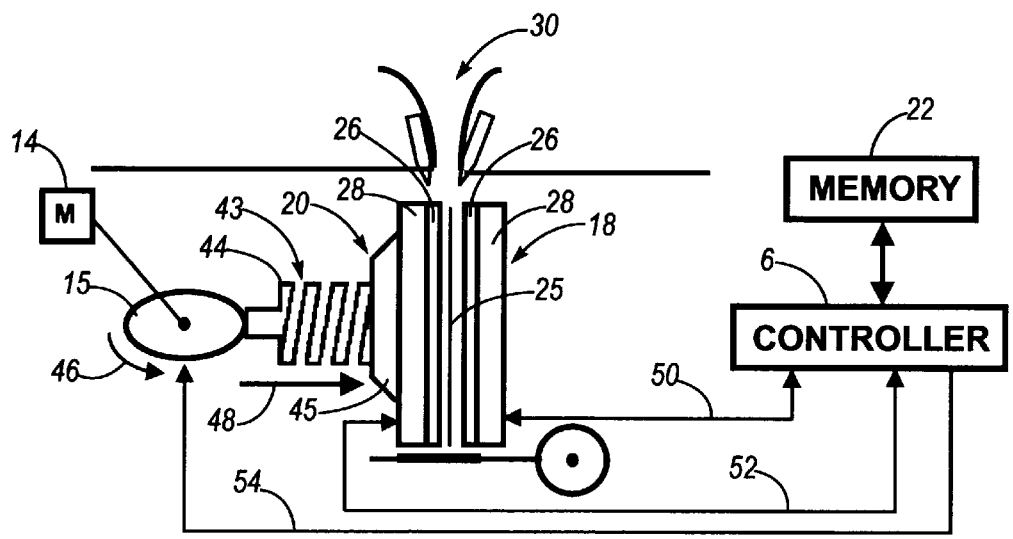
FIG. 4 illustrates the document recording stage of the document scanning system shown in FIG. 1.
Figure 5:
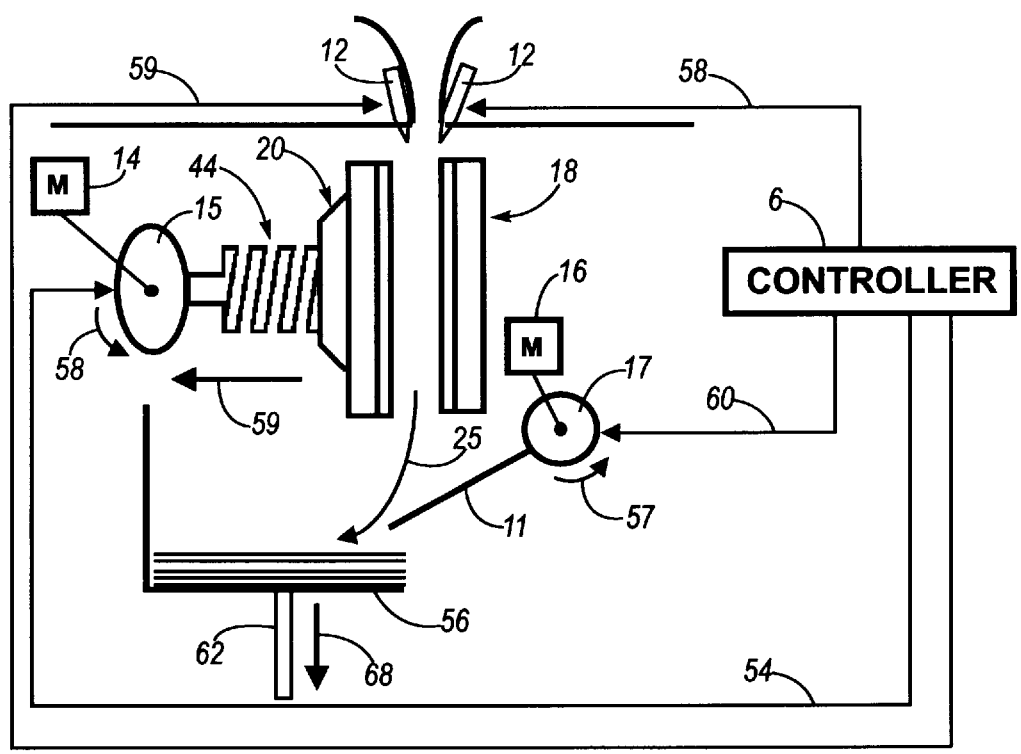
FIG. 5 illustrates the document output stage of the document scanning system shown in FIG. 1.

FIGS. 3, 4, and 5 illustrate the three operating stages of the scanning system 4: FIG. 3 illustrates the document input stage; FIG. 4 illustrates the document recording stage; and FIG. 5 illustrates the document output stage. Each stage is discussed in order below.

During the document input stage illustrated in FIG. 3, a document 25 is fed manually or automatically through paper slot 30. Documents 32 stacked in input tray 9 are automatically fed after input tray sensor 8 detects their presence. Upon receiving the detection signal over line 34, controller 6 actuates paper grabbing rollers 36 to remove and feed the bottom sheet in the input tray 12 through the paper slot 30 as indicated by arrow 40. A document that is inserted either manually or automatically into paper slot 30, drops by gravity when contact imagers 18 and 20 are spaced apart from each other. The gravitational fall of the document stops when it comes into contact with the registration stop 11. In general, the registration stop 11 can be any registration assembly that will stop the gravitational fall of a document inserted between the contact imagers 18 and 20. For example, the registration stop 11 may be a solid plate or a plurality of fingers. The registration sensor 10 embedded at the surface of the registration stop 11 transmits a signal over line 42 to controller 6 indicating that a document has been detected between the contact imagers 18 and 20.

The registration stop 11 serves two functions. It stops the fall of a document fed into slot 30 as well as registers an edge of the document relative to an edge of the contact imagers 18 and 20. An advantage of this registration system is that documents that are fed both manually or automatically are registered in a similar manner. This feature of the invention insures that documents fed by users manually are registered with the accuracy of automatically fed documents. Thus, documents which are fragile and may be damage by paper moving rollers or the like are not required to be fed automatically in order to insure proper registration with the contact imagers 18 and 20 before the document is imaged. Having received a signal indicating the presence of a sheet by the sensor 10 on the registration stop 11, the controller initiates the document recording stage of a scan cycle.

During the document recording stage illustrated in FIG. 4, images of the sides of the document 25 fed during the document input stage are recorded using contact imagers 18 and 20. Before recording any images, the document 25 is placed in intimate contact with the two-dimensional sensor arrays 26 of the contact imagers 18 and 20 respectively. To bring the document into intimate contact with both imagers 18 and 20, controller 6 outputs a signal on line 54 to engage cam motor 14. Once engaged, motor 14 rotates cam 15 as indicated by arrow 46, thereby moving contact imagers 18 and 20 together. As indicated by arrow 48, contact imager 20 moves laterally while contact imager 18 remains stationary. It will be understood by those skilled in the art that both contact imagers 18 and 20 can be moved relative to one another with two camming mechanisms. Furthermore, it will be understood by those skilled in the art that many other driving mechanisms may be used to move the contact imager 20 in a reciprocating motion relative to the contact imager 18. For example, these other driving mechanisms can include pneumatic assemblies, hydraulic assemblies, gears, or stepper motors.

In order to assure intimate contact between the document and the contact imagers, a spring loaded pressure pad 43 resiliently urges the contact imager 18 against the stationary contact imager 20. The spring loaded pressure pad 43 comprises a spring 44 and a pad 45. Besides providing intimate contact between the sensors and the document, the spring loaded pressure pad 43 enables the scanning assembly to accommodate documents with varying degrees of thickness. Intimate contact between the sensors and a document is necessary because contact imagers generally have a small depth-of-field. Also, in order to insure sufficient contact between the document and the contact imagers, the front surfaces of contact imagers 18 and 20 should be manufactured so that they are as planar as possible. Normally, contacts to the electronics are located around the periphery of a sensor arrays 26. These contacts may have an overall height that is greater than the sensors on the arrays. This height differential may potentially create a gap between the sensors when the arrays are in intimate contact to each other. One method for insuring that electronics surrounding the two dimensional array of sensors is as planar as possible is to assembly the sensor arrays using TAB (Tape Automated Bonding) technology. TAB technology provides a higher density of interconnections between chips and provides an overall height that is lower than other methods for assembling contact imagers.

After moving the imagers 18 and 20 into contact with the document 25 as indicated by directional arrow 48, controller 6 initiates image capture. Electronic signals output from contact imagers 18 and 20 while recording the sides of the document 25 are transmitted over lines 50 and 52, respectively, and stored in memory 22. Unless the document 25 is opaque contact imagers 18 and 20 should refrain from simultaneously recording both sides of a document. Since most documents are not opaque and are translucent there is a possibility that information on one side of a duplex document may bleed through to the other side if both sides of the document are illuminated at the same time. One method for minimizing bleed through of the opposite side of a document being scanned is to stagger imaging of the document sides so that both electroluminescent panels are not simultaneously illuminated.

Even if both sides of a document are not imaged at the same time, there still exists the possibility of image bleed through. The effects of image bleed through or shadows can be minimized with image correction software. Such image correction software uses an image subtractive process to minimize the bleed through effect. Because the contact imagers 18 and 20 are fixed in space relative to each other, these subtraction correction techniques are simplified because the present invention advantageously does not require that recorded front and back images be aligned before performing subtractive correction algorithms. A show-through correction technique for minimizing image bleed through is disclosed in U.S. patent application Ser. No. 08/584,792, which is incorporated herein by reference. Another alternative method for minimizing the effects of image bleed through is to set a threshold that is above the level of the bleed through so that any bleed through is ignored in the recorded image. An additional measure can be taken to reduce or eliminate the effects of image bleed through by using these different methods together. Once both sides of a document are recorded electronically in memory 22, the document recording stage has been completed.

During the document output stage illustrated in FIG. 5, the document 25 is released to output paper tray 56 or the like. After imaging both sides of document 25, the controller 6 actuates cam motor 14 to rotate cam 15 as indicated by arrow 58 with a signal on line 54. In response to rotating cam 15, the contact imager 20 and spring loaded pressure pad 43 move away from contact imager 18 in the direction of arrow 59. This movement releases the document 25 from the sides of contact imagers 18 and 20. In addition to actuating cam motor 14, controller 6 actuates pivot motor 16 over line 60 to rotate about pivot 17 as indicated by arrow 57. Since one end of registration stop 11 is attached to pivot 16, the registration stop is lowered at one end as the pivot 17 rotates.

In order to avoid the possibility that the document 25 electrostatically adheres to either contact imager 18 or 20, air jets 12 which are actuated by controller 6 using lines 58 and 59, deliver a stream of air towards each contact imager. In addition to using the air jets 12, the surface of each contact imager may be coated with a transparent anti-static material that minimizes electrostatic adhesion of documents to the sensors. Thus, by moving the contact imagers 18 and 20 apart, actuating air jets 12, and lowering one end of the registration stop 11, the document 20 is allowed to drop, by gravity, into the output tray 56. As the number of sheets in the output tray 56 increase, the height adjuster 62 moves the output tray down as indicated by arrow 68.

After completing the document output stage, the scanning system 4 is ready to repeat the scan cycle by beginning with the document input stage. At the start of the document input stage, the registration stop 11 initially returns to a horizontal position as shown in FIG. 1. This is accomplished when controller actuates pivot motor 16, thereby rotating pivot 17 and raising the lowered side of the registration stop. Once a document is stored in memory 22, images of the document can be output over connector 24 to an external device such as a printer.

Figure 6:
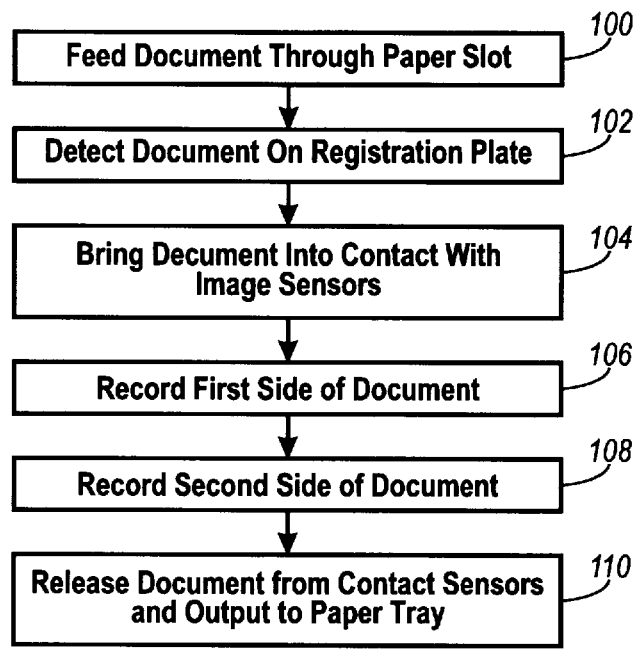
FIG. 6 illustrates a flow diagram of the operational steps of the document scanning system shown in FIG. 1.

FIG. 6 illustrates a flow diagram of the operational steps of the scanning system 5. Initially at step 100, a document is fed either manually or automatically using gravity through paper slot 30. Automatic paper feeding may be initiated when documents are located in input tray 9. At step 102, an edge of a document fed through paper slot 30 is detected on registration stop 11. In response to detecting a document on registration stop 11, the contact imagers 18 and 20 are brought into contact with the document at step 104. At step 106, a first electronic image is read-out of a first sensor array 26 and stored in memory 22. At step 108, a second electronic image is read-out of a second sensor array 26 and stored in memory 22. After completing step 108, the document is released from contact imagers 18 and 20 and output using gravity to output tray 56.

Figure 7:
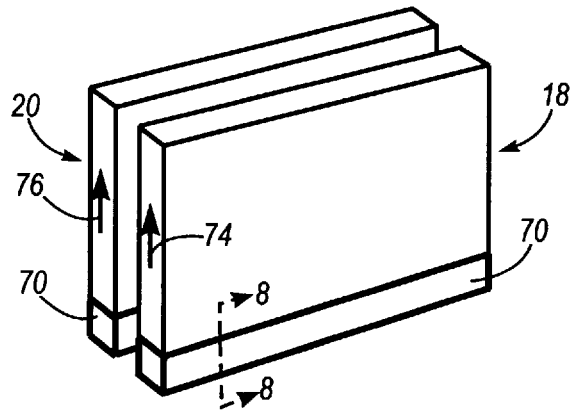
FIG. 7 illustrate an alternate embodiment of the opposing contact imagers shown in FIG. 2.
Figure 8:
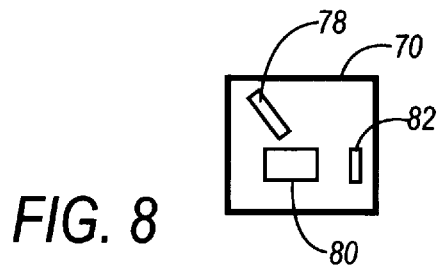
FIG. 8 illustrates a cross-section of the one-dimensional sensor array shown in FIG. 7 along line 8—8.

FIG. 7 illustrates an alternate embodiment of the invention in which the opposing contact imagers 18 and 20 shown in FIG. 1 include a one-dimensional sensor array 70. Each of the one-dimensional sensor arrays 70 mechanically move along the contact imagers 18 and 20 as indicated by arrows 74 and 76, respectively. FIG. 8 illustrates a cross-section of the one-dimensional sensor array shown in FIG. 7 along line 8—8. The one-dimensional sensor array 70 includes an illuminator 78, a plurality of gradient index lenses 80, and a CCD detector array 82. It will be understood by those skilled in the art that the present invention is not limited to using contact imagers. Instead, the present invention can be used with any scanning system that projects an image of a document onto an imaging station which comprise any suitable recording medium.

Furthermore, it will be understood by those skilled in the art that the scanning system 4 can be a simplex scanning system that is assembled with a single contact imager or imaging station. Alternatively, it will be understood by those skilled in the art that the scanning system 4 can be adapted to operate in one of two modes. In the first mode of operation only one side of a document is recorded using one of the contact images 18 and 20, and in the second mode of operation both sides of a document are recorded.

In summary, the disclosed contact scanning system has a significant advantage over currently available scanning systems because of its simplicity of design and operation. This simple design leads to a small number of moving parts that require less maintenance than other scanning systems. Furthermore, because documents that are manually fed are automatically registered, the disclosed scanning system is able to accurately record electronic signals representing images of manually fed documents.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

We claim:

1. An apparatus for scanning a document, comprising:
   a pair of opposing planar members with at least one of the planar members supporting an imaging assembly; said pair of opposing planar members having a substantially vertical orientation for gravitationally accepting along a path the document therebetween when said pair of opposing planar members are spaced a distance apart from each other;
   a registration stop positioned under said spaced pair of opposing planar members in interference with the path of the document for registering an edge of the document relative to an edge of the imaging assembly; and
   a driver for moving at least one of said planar members towards the other of said planar members to bring the document registered with said registration stop into contact with the imaging assembly for recording electronic signals representing information on one side of the document.

2. The apparatus according to claim 1, wherein the other of the planar members supports an imaging assembly for recording the other opposite side of the document.

3. The apparatus according to claim 2, wherein said opposing planar members are positioned in congruent planes with each imaging assembly having a mirrored spatial reference of the other.

4. The apparatus according to claim 1, further comprising a repositioning mechanism for moving said registration stop to another position, out of interference with the path of the document, so that the document may drop under the influence of gravity when said opposing planar members are apart from each other.

5. The apparatus according to claim 1, further comprising a spring loaded pressure pad for urging the document into close contact with the imaging assembly.

6. The apparatus according to claim 1, further comprising
   an input document tray for supporting a stack of documents;
   a feeding mechanism for driving documents from said input document tray between said pair of planar members; and
   an output document tray for receiving imaged documents.

7. The apparatus according to claim 1, further comprising a light source in the imaging assembly for illuminating the document.

8. The apparatus according to claim 1, further comprising a controller for engaging said driver after receiving a signal that the document is on said registration stop.

9. The apparatus according to claim 8, further comprising a memory coupled to said controller for recording the electronic signals representing the document.

10. The apparatus according to claim 9, further comprising an electronic printing machine coupled to said apparatus for reproducing the electronic signals stored in said memory representing the document.

11. The apparatus according to claim 9, wherein said controller further comprises means for correcting image bleed through of electronic signals recorded in said memory.

12. The apparatus according to claim 8, further wherein said controller engages said driver to move one of the planar members towards the other planar member before engaging the imaging assembly to record the document.

13. The apparatus according to claim 1, further comprising a frame with an air knife mounted thereon for directing a stream of air between said pair of opposing planar members.

14. The apparatus according to claim 1, further comprising a sensor attached to said registration stop for detecting when the document is placed between said pair of opposing planar members.

15. The apparatus according to claim 1, wherein the contact surface of the imaging assembly is coated with an anti-static material.

16. The apparatus according to claim 1, wherein the imaging assembly comprises a two-dimensional image sensor array.

17. The apparatus according to claim 1, wherein the imaging assembly comprises a one-dimensional contact sensor.

18. An apparatus for scanning a document, comprising:
    means for feeding the document along a path;
    a substantially vertical contact imaging assembly into which the document is fed by said feeding means along the path; and
    a registration assembly positioned under said imaging assembly; said registration assembly having a first position in interference with the path of the document for registering an edge of the document using gravity before recording electronic signals representing at least one side of the document with said substantially vertical contact imaging assembly.

19. The apparatus according to claim 18, wherein said registration assembly has a second position for releasing the document from said substantially vertical contact imaging assembly using gravity.

20. An apparatus for scanning a document, comprising:
    a pair of opposing planar members with at least one of the planar members supporting an imaging assembly; said pair of opposing planar members having a substantially vertical orientation for gravitationally accepting along a path the document therebetween when said pair of opposing planar members are spaced a distance apart from each other;
    means, positioned under said spaced pair of opposing planar members in interference with the path of the document, for registering an edge of the document relative to an edge of the imaging assembly; and
    means for moving at least one of said planar members towards the other of said planar members to bring the document registered with said registration stop into contact with the imaging assembly for recording electronic signals representing information on one side of the document.

* * * * *